(12) United States Patent
Catherwood et al.

(10) Patent No.: US 12,093,688 B2
(45) Date of Patent: Sep. 17, 2024

(54) MULTIBIT SHIFT INSTRUCTION

(71) Applicant: Microchip Technology Incorporated, Chandler, AZ (US)

(72) Inventors: Michael Catherwood, Tyler, TX (US); David Mickey, Chandler, AZ (US); Ashish Desai, Chandler, AZ (US); Jason Sachs, Chandler, AZ (US); Calum Wilkie, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/989,067

(22) Filed: Nov. 17, 2022

(65) Prior Publication Data

US 2023/0176867 A1    Jun. 8, 2023

Related U.S. Application Data

(63) Continuation of application No. 17/982,980, filed on Nov. 8, 2022, now abandoned.

(60) Provisional application No. 63/285,752, filed on Dec. 3, 2021.

(51) Int. Cl.
  *G06F 9/30*    (2018.01)
(52) U.S. Cl.
  CPC ...... *G06F 9/30032* (2013.01); *G06F 9/30123* (2013.01)
(58) Field of Classification Search
  CPC .................. G06F 9/30032; G06F 9/30123
  See application file for complete search history.

(56) References Cited

U.S. PATENT DOCUMENTS

| | | | |
|---|---|---|---|
| 5,559,730 A | 9/1996 | Marui et al. | ................... 708/209 |
| 6,738,895 B1* | 5/2004 | Klein | ........................ G06F 9/32 |
| | | | 712/228 |
| 2005/0050120 A1 | 3/2005 | Shih | ............................. 708/209 |
| 2005/0114631 A1* | 5/2005 | Liang | .................. G06F 9/30032 |
| | | | 712/E9.034 |
| 2009/0049284 A1* | 2/2009 | Morris | ................ G06F 9/30021 |
| | | | 712/225 |
| 2018/0307486 A1* | 10/2018 | Botman | .................... G06F 7/00 |

OTHER PUBLICATIONS

International Search Report and Written Opinion, Application No. PCT/US2022/050264, 10 pages.

* cited by examiner

*Primary Examiner* — Michael J Metzger
(74) *Attorney, Agent, or Firm* — SLAYDEN GRUBERT BEARD PLLC

(57) ABSTRACT

An article of manufacture includes a non-transitory machine-readable medium. The medium includes instructions that cause a processor to execute a shift instruction. The shift instruction is to cause a source data in memory to be shifted left or shifted right. The shift instruction is to include a source parameter and a bit size parameter. The processor is to execute the shift instruction through a shift of a first source word of the source data by the bit size parameter to yield a first intermediate word, a shift of a second source word of the source data by the bit size parameter to yield a second intermediate word and a first set of shifted-out bits, and through execution of a logical OR operation on the first intermediate word and the first set of shifted-out bits to yield a first result word.

20 Claims, 6 Drawing Sheets

500

505
Load a shift instruction. The shift instruction is to cause a source data in memory to be shifted left or shifted right. The source data includes source words. The shift instruction includes a source parameter to identify the source data. The shift instruction includes a bit size parameter of a specified number of bits to be shifted.

510
Execute the shift instruction by shifting a first source word of source data for the specified number of bits to yield a first intermediate word.

515
Execute the shift instruction by shifting a second source word of the source data for the specified number of bits to yield a second intermediate word and a first set of shifted-out bits.

520
Execute the shift instruction by executing a logical OR operation on the first intermediate word and the first set of shifted-out bits to yield a first result word.

FIG. 5

MULTIBIT SHIFT INSTRUCTION

PRIORITY

The present application is a continuation of U.S. Non-Provisional patent application Ser. No. 17/982,980, filed on Nov. 8, 2022, and to U.S. Provisional Patent Application No. 63/285,752 filed Dec. 3, 2021, the contents of which are hereby incorporated in their entirety.

TECHNICAL FIELD

The present disclosure relates to computer processing, and more particularly to a multi-bit shift instruction.

BACKGROUND

Computer processors (e.g., microprocessors, central processing units (CPUs), digital signal processors (DSPs), digital signal controllers (DSCs), etc.) may shift or rotate data through various instructions. Performing such shift or rotate operations through larger chunks of data, such as data that extends over multiple bytes or words, in software may be prohibitively slow and may require programmers to utilize multiple commands and utilize multiple data structures.

Examples of the present disclosure address one or more of these issues.

BRIEF DESCRIPTION OF THE FIGURES

FIG. 5 is an illustration of an example method for execution of a variable precision multibit shift instruction, according to examples of the present disclosure.

DETAILED DESCRIPTION

Figure 1:
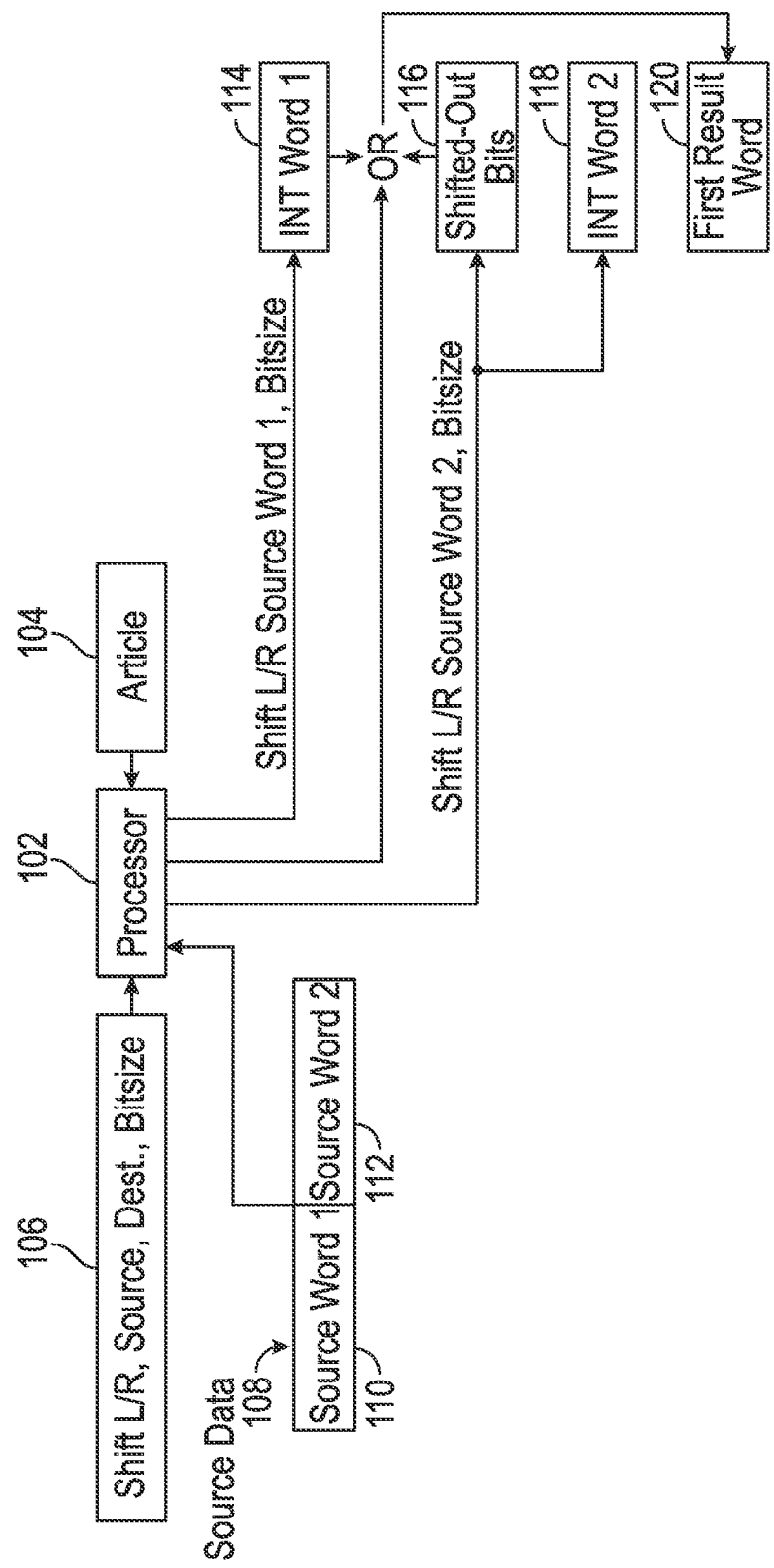
FIG. 1 is an illustration of an example system for variable precision multi-bit shift or rotate instruction, according to examples of the present disclosure.

FIG. 1 is an illustration of an example system 100 for variable precision multi-bit shift or rotate instruction, according to examples of the present disclosure. System 100 may include an article 104 of manufacture. Article 104 may include a non-transitory machine-readable medium such as a memory. The medium may include instructions for a processor 102 to execute to load and execute other instructions. For example, the instructions of article 104, when read and executed by a processor, may cause the processor to load a shift instruction 106. Shift instruction 106 may cause a source data 108 in memory to be shifted left or shifted right. Source data 108 may include multiple source words, such as source word 1 110 and source word 2 112. Shift instruction 106 may include a source parameter, given as SOURCE. The source parameter may identify source data 108 that is to be shifted by shift instruction 106, e.g., by identifying a memory address of source data 108, or a register comprising source data 108. Shift instruction 106 may include a destination parameter, given as DESTINATION. The destination parameter may identify where the shifted source data is to be stored. Shift instruction 106 may include a bit size parameter, given as BIT SIZE. The bit size parameter may identify a specified number of bits to be shifted. Processor 102 may be configured to execute shift instruction 106 through execution of a logical shift of source word 1 110 of source data 108 by the specified number of bits, as indicated by BIT SIZE, to yield a first intermediate word, such as first intermediate word 1 114. Processor 102 may be configured to execute a logical shift of source word 2 112 of source data 108 by the specified number of bits of BIT SIZE to yield a second intermediate word, such as second intermediate word 2 118 and a first set of shifted-out bits 116. Processor 102 may be configured to cause execution of a logical OR operation on intermediate word 1 114 and first set of shifted-out bits 116 to yield a first result word 120. The OR operation may be performed in hardware. A complete result of shift instruction 106 may include a concatenation of first result word 120 and second intermediate word 2 118.

A register containing first and second intermediate words 114, 118 and a register containing first result word 120 may be a same register, wherein the OR is performed in-place and the results are written back into the register containing first and second intermediate words 114, 118.

Figure 2:
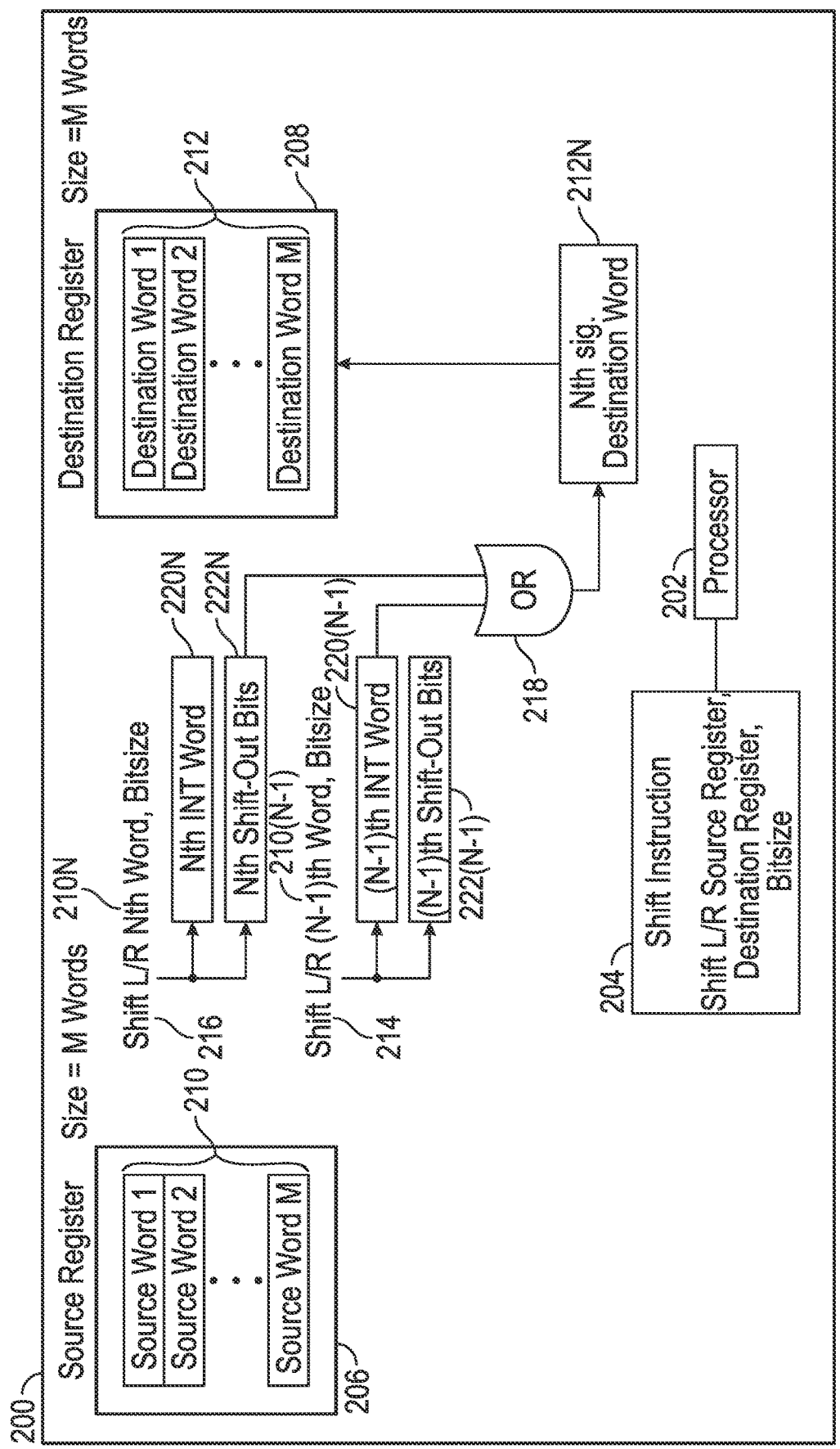
FIG. 2 is an illustration of an example microcontroller for variable precision multi-bit shift or rotate instruction, according to examples of the present disclosure.

FIG. 2 is an illustration of an example microcontroller 200 for variable precision multi-bit shift or rotate instruction, according to examples of the present disclosure.

The microcontroller may include a source register 206, a processor 202, and a destination register 208. Source register 206 and destination register 208 may be of a same size or of a different size. For example, each of registers 206, 208 may be of a size or capacity of M words. Source register 206 may include M source words 210. Destination register 208 may include M destination words 208. Processor 202 may be configured to execute a shift instruction 204. Shift instruction 204 may cause a shift, left or right, of the concatenated contents of source register 206 into destination register 208. Source register 206 and destination register 208 may be a same register, wherein the shift is performed in-place and the results are written into the source register 206. Shift instruction 204 may be configured to cause processor 202 to shift such contents left or right.

Depending upon whether shift instruction 204 is to shift source register 206 contents left or right, execution of shift instruction 204 may begin with the least or most significant words of source register 206. For example, in a shift left execution, execution may begin with a last source word M of source words 210, which is the most significant word. For example, in a shift right shift execution, execution may begin with a first source word of source words 210, which is the least significant word.

Processor 202 may be configured to execute shift instruction 204 to shift contents of source register 206 and store a result in destination register 208. Shift instruction 204 may include identifiers of source register 206 and destination register 208. Shift instruction 204 may include an identifier of a specified number of bits of source register 206 for which the instruction will shift the source, given as BIT SIZE. Execution of shift instruction 204 may include iterative shifting of source words 210 of source register 206. The iterative shifting of source words 210 of source register 206 may include a given iteration.

A given iteration of shifting may include selecting an (N−1)th word of source words 210. In a left shift, the (N−1)th word may be the most significant word that has not yet been processed. In a right shift, the (N−1)th word may be the least significant word that has not yet been processed. The selected (N−1)th word 210(N−1) may be shifted left or right by a number of bits according to BIT SIZE using instruction 216. This may yield an (N−1)th intermediate word 220(N−1) and an (N−1)th set of shifted-out bits 222(N−1). Moreover, an Nth word (referenced as 210N) may be shifted left or right according to BIT SIZE using instruction 214. This may yield an Nth intermediate word 220N and an Nth set of shifted-out bits 222N. The (N−1)th intermediate word 220(N−1) may be operated on with a logical OR 218 with the Nth set of shifted-out bits 222N to yield an (N−1)th destination word 212N. The shifted out bits may be replaced with zeroes. The (N−1)th most significant destination word 212(N−1) may be stored as a corresponding one of destination words 212 in destination register 208. Logical OR 218 may be performed in hardware.

The iterative shifting may be performed from a least significant word of source words 210 to a most significant word of source words 210.

Destination register 208 and a register containing intermediate words 220 may be a same register, wherein the OR 218 is performed in-place and the results are written back into the register containing intermediate words 220.

Figure 3:
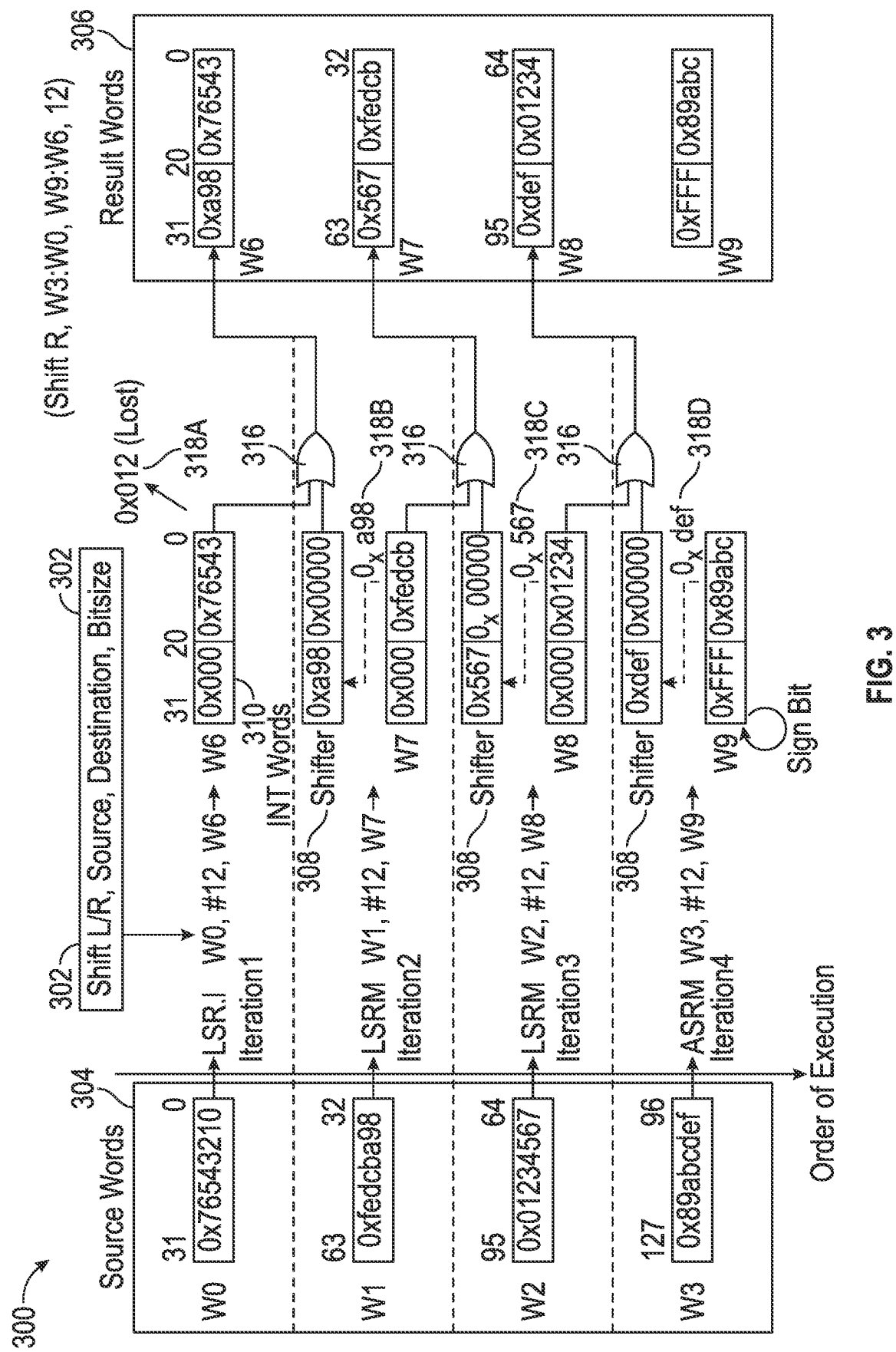
FIG. 3 is an illustration of execution of a processor of variable precision multi-bit shift or rotate instructions, according to examples of the present disclosure.

FIG. 3 is an illustration of execution of a processor 300 of variable precision multi-bit shift or rotate instructions, according to examples of the present disclosure. Processor 300 may implement, fully or in part, processor 102 or processor 202 executing shift instructions 106 or 204. Processor 300 may execute instruction 302, which may implement, fully or in part, instructions 106, 204. Instruction 302 may support multi-bit shifts or rotations of data of any precision and thus width.

Instruction 302 may be a left shift or a right shift. In the example of FIG. 3, instruction 302 may be executed as a right shift. Instruction 302 may shift contents from source words 304 and store the results in result words 306. Source words 304 may implement, fully or in part, source data 108 or source register 206. Result words 306 may implement, fully or in part, result word 120 or destination register 208. Source words 304 and result words 306 may be stored within or without processor 300. During the execution of instruction 302, results may be stored in intermediate words 310. Intermediate words 310 may implement, fully or in part, intermediate words 114, 118, 222. In some examples, intermediate words 310 may be included in an intermediate register. In some examples, a register including result words 306 and a register including intermediate words 310 may be a same register wherein an OR 316 is performed in-place and the results are written back into the register containing intermediate words 310.

Processor 300 may include shifter logic 308. Shifter logic 308 may be implemented by analog circuitry, digital circuitry, or any suitable combination thereof to implement shift and rotation instructions. Shifter logic 308 may be configured to perform iterative shifting instructions. Although a single instance of shifter logic 308 is shown, any suitable number of instances of shifter logic 308 may be used.

Registers including source words 304, intermediate words 310, or result words 306 may be included in processor 300 or in memory accessible to processor 300.

Instruction 302 may designate a shift left or a shift right operation, a source denoted as SOURCE, a destination denoted as DESTINATION, and an indicator of a number of bits for which the instruction will shift the source and store the result in the destination. The indicator may be given as BIT SIZE. For example, instruction 302 may be given as "SHIFTR, W3:W0, W9:W6, 12", wherein the contents of a register or a concatenated series of registers W3:W0 may be shifted right by 12 bits and the results stored in a register or a concatenated series of registers W9:W6.

Shown in FIG. 3 are example values for W3:W0, which may be source words 304. The example value for W3:W0 may be 128 bits long and may be 89abcdef01234567fedcba9876543210. 0x89abcdef may be stored in W3, 0x01234567 may be stored in W2, 0xfedcba98 may be stored in W1, and 0x76543210 may be stored in W0.

Processor 300 may be configured to iteratively execute instruction 302 with a series of shift instructions. The series of shift instructions may be conventional arithmetic, logical, or other suitable shift instructions. The number of shift instructions that are used to iteratively execute instruction 302 may depend upon the number of source words 304. For example, with four source words 304, processor 300 may be configured to iteratively use four constituent shift instructions to execute instruction 302. Accordingly, instruction 302 may shift or rotate data that is larger than those directly supported by native or existing byte or word shift or rotate instructions of the processor. Examples of the present disclosure may include constituent shift instructions to execute instruction 302 that are efficient for performing a multi-bit shift or rotation of data that is of a larger size than the native data size of a processor. For example, the native data size may be, for example, 32-bits, and instruction 302 may rotate or shift 128-bits or more of data. Examples of the present disclosure may include constituent shift instructions that may be performed in two cycles or less, each. The sequence of constituent shift instructions executed to carry out instruction 302 may require less execution cycles than other solutions.

The constituent shift instructions to execute instruction 302 may include logical shift right (LSR), logical shift left (LSL) arithmetic shift right (ASR), and arithmetic shift left (ASL). Iterative shift instructions may include execution options, such as ".L", ".W", or ".B" to specify a length of a constituent register. For example, ".L" may specify an operation on a word that is 32 bits long, ".W" may specify an operation on a word that is 16 bits long, and ".B" may specify an operation on a word that is 8 bits long. Moreover, the iterative shift instructions may inherently or with execution options specify whether the BIT SIZE is referenced as a specified constant value, is of a fixed size designated in another way (such as inherently by a specific instance of an iterative shift function), or is referenced in a memory location such as a register.

Moreover, in one example, the constituent shift instructions to execute instruction 302 may include a shift instruction wherein shifted-out bits 318 from another shift instruction are used. Shifted-out bits 318 may arise from bits shifted out of source words 304 for which a shift instruction has been applied. Shifted-out bits 318 may implement, fully or in part, shifted-out bits 116, 222. Shifted-out bits 318 may be merged with the result (such as intermediate words 310) of an immediately prior shift operation to create a result (such as result words 306). In one example, shifted-out bits 318 may be captured and stored within the digital logic of shifter 308 without needing external storage in a register. The merging is shown in the example of FIG. 3 with OR function 316. The OR function 316 may be implemented with digital logic.

Shifter 308 may be configured to shift out a number of bits specified by the constituent shift instruction. The memory locations inside of shifter 308 which included shifted-out bits 318 may have a value of zero. The contents from shifter 308 that make up shifted-out bits 318 may be written to an intermediate word 310. Those contents and memory locations of shifter 308 that were shifted, but not shifted out to make up shifted-out bits 318, may keep their existing values. Such bits may thus remain in shifter 308 after the performance of the shifting out. This functionality may be used so that the bits that remain in shifter 308 after the performance of the shifting out can be combined, where such bits remain, with OR function 316 and the contents of an intermediate word 310 with an immediately, previously shifted word.

Constituent shift instructions may designate that (A) shifting contents of a source word 304 and writing the result to an intermediate word 310, and (B) merging the shifted-out bits 318 of the shift operation as they reside in shifter 308 with a previous intermediate word 310 using OR function 316, are to be performed by the same constituent shift instruction. This may be performed over two execution cycles. Such constituent shift instructions may be designated in any way, such as a separate instruction or a flag or other designation on a traditional shift instruction. Such instructions in the present disclosure may be referred to with an "M" designation at the end of the instruction name.

The result of OR function 316 may be written to corresponding result words 306. In one example, result words 306 may be the same as intermediate words 310, implemented in a same register, such that OR function 316 is applied to intermediate words 310 with the results stored in-place.

In the example of FIG. 3, instruction 302 may be configured to right shift the contents of a specified portion of data that is four words wide or long, i.e., the contents of registers W3, W2, W1, W0. The destination of the shift may be four words wide or long—the contents of registers W9, W8, W7, W6. The data may be shifted right by 12 bits.

Thus, processor 300 may load shift instruction 302, wherein shift instruction 302 is to cause source data as source words 304 in memory to be shifted right, the source data including a plurality of source words 304, and shift instruction 302 includes a source parameter such as SOURCE to identify the source data and a bit size parameter such as BIT SIZE to identify a specified number of bits by which the source data is to be shifted.

To implement instruction 302, processor may perform four iterative shift instructions, one for each word. The iterative shift instructions that are constituents of instruction 302 may include LSR.1, LSRM, and ASRM. LSR.1 may be a logical shift right of data of a length of a word. LSRM may be a logical shift right with merging operation to merge shifted-out bits 318 with a previously shifted intermediate word 310. ASRM may be similar to LSRM except that the sign of the word is shifted in, rather than values of "0" being shifted in. ASRM may be used when shifting a word during a last iterative shift operation in order to preserve a data sign of the result.

Source words 304 may include the contents of registers W3:W0. Intermediate words 310 and result words 306 may include the contents of registers W9:W6.

Operation for a shift right may operate from a lowest to a highest most significant word. Thus, instruction 302 may be executed first by executing an instruction to shift W0 by BIT SIZE and place the contents in W6. Instruction LSR.1 W0, #12, W6 may shift the contents of W0 right by 12 bits and place the results in W6. The shifted-out bits 318A may be lost. The contents of W0 may be 0x76543210, the lowest significant 32 bits of source words 304. After shifting with instruction LSR.1 W0, #12, W6, W6 may include 0x00076543, wherein values of 0 are shifted in.

Next, instruction 302 may continue to be executed by executing an instruction to shift W1 by BIT SIZE and place the contents in W7, and further to take the shifted-out bits 318B as resident in shifter 308 and merge them, using OR function 316, with the contents of W6 and store the results in result words 306. The results of the OR function may be stored in place in W6. LSRM W1, #12, W7 may be used. The contents of W1 may be 0xfedcba98, the next highest significant bits of source words 304. After shifting with instruction LSRM W1, #12, W7, W7 may include 0x000fedcb, wherein values of 0 are shifted in. Shifted out bit values 318B may be 0xa98, and these may be stored in shifter 308, while the rest of shifter 308 may have values of 0 stored as such values are in memory locations wherein the contents were shifted out. Then, the contents of shifter 308 may be merged with W6 using OR function 316 and the results stored back in W6. This may be the value 0xa9876543. W6 may be also a result word 306.

Thus, a shift of a first source word such as source word W0 of the source data of source words 304 may be performed by the specified number of bits BIT SIZE to yield a first intermediate word such as W6. Moreover, a shift of a second source word such as W1 may yield a second intermediate word such as W7 and a first set of shifted-out bits such as 318B. In addition, an execution of a logical OR operation by OR function 316 may be performed on the first intermediate word such as W6 and the first set of shifted-out bits such as 318B to yield a first result word such as W6 in result words 306. The logical OR operation such as OR function 316 on the first intermediate word W6 and the first set of shifted-out bits 318B may be performed in place on the first intermediate word W6 to cause the first intermediate word to be the first result word W6 as stored in result words 306. The logical OR operation may be applied to shifted-out bits 318 as most significant bits against first intermediate word W6. BIT SIZE may be less than a size of a given source word 304. In the example of FIG. 3, shift instruction 302 may be to cause the source data such as source words 304 in memory to be shifted right, the first source word W0 may be less significant than the second source word W1; and a shift of the first source word W0 to yield the first intermediate word W6 is to be performed before the shift of the second source word W7.

Moreover, source words 304 may be considered as stored in a source register and result words 306 may be considered as stored in a destination register. Result words 306 may also be referenced as destination words. Processor 300 may execute shift instruction 302 to shift contents of the source register including source words 304 and store a result in the destination register including destination words, also known as result words 306. Instruction 302 may include a specified number of bits by which the source register is to be shifted, given as BIT SIZE, and the execution of instruction 302 may include iterative shifting of words of the source register including source words 304. Thus, shifting to execute instruction 302 may include selecting an Nth word of the plurality of source words 304. In a right shift, the least significant word not yet shifted may be selected, while in a left shift, the most significant word not yet shifted may be selected.

The shift of the Nth word, such as W1, of the plurality of source words 304 may yield an Nth intermediate word, such as W7 and an Nth set of shifted-out bits such as 318B. The execution of instruction 302 may include a shift of an (N−1)th word, such as W0, to yield an (N−1)th intermediate word such as W6 and an (N−1)th set of shifted-out bits such as 318B. The execution of instruction 302 may include execution of a logical OR operation such as OR function 316 on the (N−1)th intermediate word such as W6 and the Nth set of shifted-out bits such as 318B to yield an (N−1)th destination word such as W6, in result words 306 in the destination register.

Also, thus, when shift instruction 302 is a right shift instruction, the Nth source word (such as W1) may be more significant than the (N−1)th source word (such as W0), and the shift of the Nth word of the source register to yield the Nth intermediate word (such as W7) may be performed after execution of the shift of the (N−1)th word of the source register.

Next, instruction 302 may continue to be executed by executing an instruction to shift W2 and place the contents in W8, and further to take the shifted-out bits 318C as still resident in shifter 308 and merge them, using OR function 316, with the contents of W7 and store the results in result words 306. The results may be stored in place in W7. LSRM W2, #12, W8 may be used. The contents of W2 may be 0x01234567, the next highest significant bits of source words 304. After shifting with instruction LSRM W2, #12, W8, W8 may include 0x00001234, wherein values of 0 are shifted in. Shifted out bit values 318C may be 0x567, and these may be stored in shifter 308, while the rest of shifter 308 may have values of 0 stored, wherein the rest of the contents were shifted. Then, the contents of shifter 308 may be merged with W7 using OR function 316 and the results stored back in W7. This may be the value 0x567fedcb. W7 may be also a result word 306.

Thus, execution of instruction 302 may include a shift of a third source word such as W2 by the specified number of bits provided by BIT SIZE to yield a third intermediate word such as W8 and a second set of shifted-out bits such as 318C. Moreover, execution of instruction 302 may include a logical OR operation such as OR function 316 on the second intermediate word such as W7 and the second set of shifted-out bits 318C to yield a second result word such as W7 as stored in result words 306.

Moreover, execution of instruction 302 may thus shift the Nth word (such as W2), shift the (N−1)th word (such as W1), and perform a logical OR operation such as OR function 316 on the (N−1)th intermediate word (such as W7) and the Nth set of shifted-out bits (such as 318C) to yield the (N−1)th destination word (such as W7 in result words 306) for at least intervening words (such as W1 and W2) of the plurality of source words in the source register between a first word (such as W0) and a last word (such as W3) of the plurality of source words 304.

In addition the logical OR operation such as OR function 316 on an (N−1)th intermediate word (such as W7) and the Nth set of shifted-out bits (such as 318C) is to be performed in place on the (N−1)th intermediate word to cause the (N−1)th intermediate word to be the (N−1)th destination word, such as W7 in result words 306.

Next, instruction 302 may continue to be executed by executing an instruction to shift W3 and place the contents in W9, and further to take the shifted-out bits 318D as still resident in shifter 308 and merge them, using OR function 316, with the contents of W8 and store the results in result words 306. The results may be stored in place in W8. ASRM W3, #12, W9 may be used. The contents of W3 may be 0x89abcdef, the most significant bits of source words 304. After shifting with instruction ASRM W3, #12, W9, W9 may include 0xFFF89abc, wherein values of F are shifted in.

By using ASRM, rather than LSRM, values of F rather than 0 may be shifted in, and these shifted-in values of F may serve as a sign bit. Shifted out bit values 318D may be 0xdef, and these may be stored in shifter 308, while the rest of shifter 308 may have values of 0 stored, wherein the rest of the contents were shifted. Then, the contents of shifter 308 may be merged with W8 using OR function 316 and the results stored back in W8. This may be the value 0xdef01234. W8 may be also a result word 306. Moreover, as execution of instruction 302 has ended, the results stored in W9 may also be a result word 306.

Thus, execution of instruction 302 may include a shift of a last source word such as W3 by the specified number of bits specified by BIT SIZE to yield a last result word W9 and a last set of shifted-out bits such as 318D. Moreover, execution of instruction 302 may include execution of a logical OR operation such as OR function 316 on a next-to-last intermediate word such as W8 and the last set of shifted-out bits such as 318D to yield a next-to-last result word W8 as stored in result words 306.

Moreover, execution of instruction 302 may include a shift a last source word (such as W3) of the source register by the specified number of bits (such as BIT SIZE) to yield a last destination result word (such as W9) and a last set of shifted-out bits (such as 318D), and execution of a logical OR operation (such as OR function 316) on a next-to-last intermediate word (such as W8) and the last set of shifted-out bits (such as 318D) may yield a next-to-last destination word (such as W8 stored in result words 306).

Figure 4:
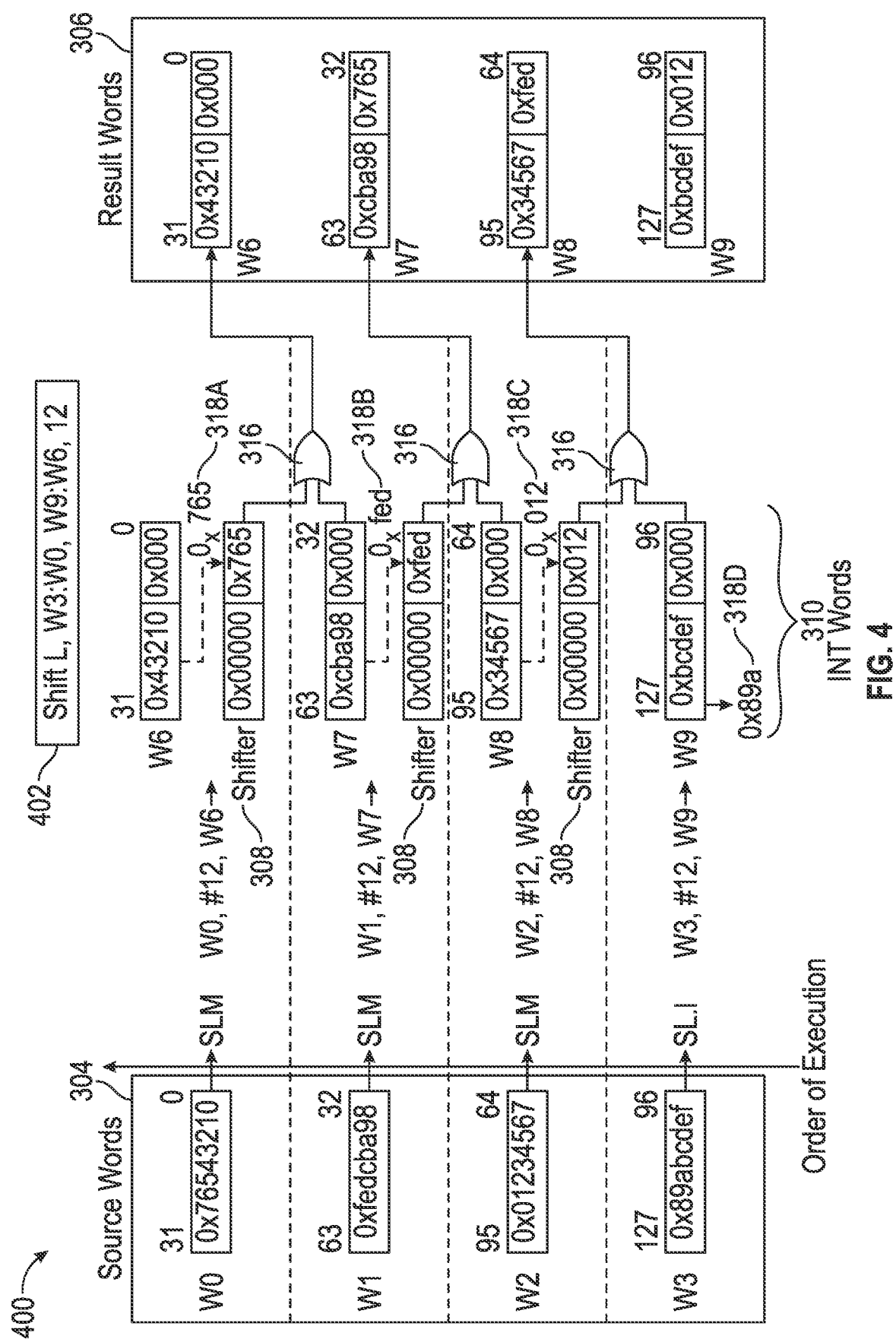
FIG. 4 is an illustration of execution of processor of a left shift instruction, according to examples of the present disclosure.

FIG. 4 is an illustration of execution of processor 300 of a left shift instruction, analogous to the right shift operations shown in FIG. 3, according to examples of the present disclosure.

Instruction 402 may be a left shift instruction. Instruction 402 may shift contents from source words 304 and store the results in result words 306. During the execution of instruction 402, results may be stored in intermediate words 310.

Instruction 402 may designate a shift left or a shift right operation, a source denoted as SOURCE, a destination denoted as DESTINATION, and an indicator of a number of bits by which the instruction will shift the source and store the result in the destination. The indicator may be given as BIT SIZE. For example, instruction 402 may be given as "SHIFTL, W3:W0, W9:W6, 12", wherein the contents of a register or a concatenated series of registers W3:W0 may be shifted left by 12 bits and the results stored in a register or a concatenated series of registers W9:W6.

Shown in FIG. 4 are example values for W3:W0, which may be the same as shown in FIG. 3. The example value may be 128 bits long and may be 89abcdef01234567fedcba9876543210. 0x89abcdef may be stored in W3, 0x01234567 may be stored in W2, 0xfedcba98 may be stored in W1, and 0x76543210 may be stored in W0.

Processor 300 may be configured to iteratively execute instruction 402 with a series of shift instructions. The series of shift instructions may be conventional arithmetic, logical, or other suitable shift instructions. The number of shift instructions that are used to iteratively execute instruction 402 may depend upon the number of source words 304. For example, with four source words 304, processor 300 may be configured to iteratively use four constituent shift instructions to execute instruction 402. Accordingly, instruction 402 may shift or rotate data that is larger than those directly supported by native or existing byte or word shift or rotate instructions of the processor. Examples of the present disclosure may include constituent shift instructions to execute instruction 402 that are efficient for performing a multi-bit shift or rotation of data that is of a larger size than the native data size of a processor. For example, the native data size may be, for example, 32-bits, and instruction 402 may rotate or shift 128-bits or more of data. Examples of the present disclosure may include constituent shift instructions that may be performed in two cycles or less, each. The sequence of constituent shift instructions executed to carry out instruction 402 may require less execution cycles than other solutions.

The constituent shift instructions to execute instruction 402 may include shift left (SL). Iterative shift instructions may include execution options, such as ".L", ".W", or ".B" to specify a length of a constituent register. For example, ".L" may specify an operation on a word that is 32 bits long. Moreover, the iterative shift instructions may inherently or with execution options specify whether the BIT SIZE is referenced as a specified constant value, is of a fixed size, or is referenced in a memory location such as a register.

Moreover, in one example, the constituent shift instructions to execute instruction 402 may include a shift instruction wherein shifted-out bits 318 from another shift instruction are used. Shifted-out bits 318 may arise from bits shifted out of source words 304 for which a shift instruction has been applied. Shifted-out bits 318 may implement, fully or in part, shifted-out bits 116, 222. Shifted-out bits 318 may be merged with the result (such as intermediate words 310) of an immediately prior shift operation to create a result (such as result words 306). In one example, shifted-out bits 318 may be captured and stored within the digital logic of shifter 308 without needing external storage in a register. The merging is shown in the example of FIG. 4 with OR function 316. The OR function 316 may be implemented with digital logic.

Shifter 308 may be configured to shift out a number of bits specified by the constituent shift instruction. The memory locations inside of shifter 308 which included shifted-out bits 318 may have a value of zero. The contents from shifter 308 that make up shifted-out bits 318 may be written to an intermediate word 310. The memory locations insider of shifter 308 which did not include those bits to be shifted out by the constituent shift instruction may keep their existing values. Such bits may thus remain in shifter 308 after the performance of the shifting out. This functionality may be used so that the bits that remain in shifter 308 after the performance of the shifting out can be combined, where such bits remain, with OR function 316 and the contents of an intermediate word 310 with an immediately, previously shifted word.

Constituent shift instructions may designate that (A) shifting contents of a source word 304 and writing the result to an intermediate word 310, and (B) merging the shifted-out bits 318 of the shift operation as they reside in shifter 308 with a previous intermediate word 310 using OR function 316, are to be performed by the same constituent shift instruction. This may be performed over two execution cycles. Such constituent shift instructions may be designated in any way, such as a separate instruction or a flag or other designation on a traditional shift instruction. Such instructions in the present disclosure may be referred to with an "M" designation at the end of the instruction name.

The result of OR function 316 may be written to corresponding result words 306. In one example, result words 306 may be the same as intermediate words 310, implemented in a same register, such that OR function 316 is applied to intermediate words 310 with the results stored in-place.

The example of FIG. 4 may vary from FIG. 3 in that words are iteratively shifted with constituent shift instructions from most significant words (i.e., W3) to least significant words (i.e., W0) as shown in FIG. 4 to implement a shift left, compared to iteratively shifting with constituent shift instructions from least significant words to most significant words as shown in FIG. 3.

In the example of FIG. 4, instruction 402 may be configured to left shift the contents of a specified portion of data that is four words wide or long—the contents of registers W3, W2, W1, W0. The destination of the shift may be four words wide or long—the contents of registers W9, W8, W7, W6. The data may be shifted right by 12 bits.

Thus, processor 300 may load shift instruction 402, wherein shift instruction 402 is to cause source data as source words 304 in memory to be shifted left, the source data including a plurality of source words 304, and shift instruction 302 includes a source parameter such as SOURCE to identify the source data and a bit size parameter such as BIT SIZE to identify a specified number of bits by which source words 304 are to be shifted.

To implement instruction 402, processor 300 may perform four iterative shift instructions, one for each word. The iterative shift instructions that are constituents of instruction 402 may include SLM and SL.1. SL.1 may be a shift left of data of a length of a word. SLM may be a shift left with merging operation to merge shifted-out bits 318 with a previously shifted intermediate word 310.

Source words 304 may include the contents of registers W3:W0. Intermediate words 310 and result words 306 may include the contents of registers W9:W6.

Operation for a shift left may operate from a highest to a lowest most significant word.

Thus, instruction 402 may be executed first by executing an instruction to shift W3 and place the contents in W9. The shifted-out bits 318D may be discarded. The contents of W3 may be 0x89abcdef, the highest significant 32 bits of source words 304. After shifting with instruction SL.1 W3, #12, W9, W9 may include 0xbcdef000, wherein values of 0 are shifted in.

Next, instruction 402 may continue to be executed by executing an instruction to shift W2 and place the contents in W8, and further to take the shifted-out bits 318C as still resident in shifter 308 and merge them, using OR function 316, with the contents of W9 and store the results in result words 306. The results may be stored in place in W9. SLM W2, #12, W8 may be used. The contents of W2 may be 0x01234567, the next lowest significant bits of source words 304. After shifting with instruction SLM W2, #12, W8, W8 may include 0x34567000, wherein values of 0 are shifted in. Shifted out bit values 318C may be 0x012, and these may be stored in shifter 308, while the rest of shifter 308 may have values of 0 stored, wherein the rest of the contents were shifted. Then, the contents of shifter 308 may be merged with W9 using OR function 316 and the results stored back in W9. This may be the value 0xbcdef012. W9 may be also a result word 306.

Thus, a shift of a first source word such as source word W3 of the source data of source words 304 may be performed for the specified number of bits BIT SIZE to yield a first intermediate word such as W9. Moreover, a shift of a second source word such as W2 may yield a second intermediate word such as W8 and a first set of shifted-out bits such as 318C. In addition, an execution of a logical OR operation by OR function 316 may be performed on the first intermediate word such as W9 and the first set of shifted-out bits such as 318C to yield a first result word such as W9 in result words 306. The logical OR operation such as OR function 316 on the first intermediate word W9 and the first set of shifted-out bits 318C may be performed in place on the first intermediate word W9 to cause the first intermediate word to be the first result word W9 as stored in result words 306. The logical OR operation may be applied to shifted-out bits 318C as least significant bits against first intermediate word W9. BIT SIZE may be less than a size of a given source word 304. In the example of FIG. 4, shift instruction 302 may be to cause the source data such as source words 304 in memory to be shifted left, the first source word W3 may be more significant than the second source word W2; and a shift of the first source word W3 to yield the first intermediate word W9 is to be performed before the shift of the second source word W2.

Moreover, source words 304 may be considered as stored in a source register and result words 306 may be considered as stored in a destination register. Result words 306 may also be referenced as destination words. Processor 300 may execute shift instruction 302 to shift contents of the source register including source words 304 and store a result in the destination register including destination words, also known as result words 306. Instruction 302 may include a specified number of bits by which the source register is to be shifted, given as BIT SIZE, and the execution of instruction 302 may include iterative shifting of words of the source register including source words 304. Thus, shifting to execute instruction 302 may include selecting an Nth word of the plurality of source words 304. In a right shift, the least significant word not yet shifted may be selected, while in a left shift, the most significant word not yet shifted may be selected.

The shift of the Nth word, such as W2, of the plurality of source words 304 may yield an Nth intermediate word, such as W8 and an Nth set of shifted-out bits such as 318C. The execution of instruction 302 may include a shift of an (N−1)th word, such as W3, to yield an (N−1)th intermediate word such as W9 and an (N−1)th set of shifted-out bits such as 318D. The execution of instruction 302 may include execution of a logical OR operation such as OR function 316 on the (N−1)th intermediate word such as W9 and the Nth set of shifted-out bits such as 318C to yield an (N−1)th destination word such as W9, in result words 306 in the destination register.

Also, thus, when shift instruction 302 is a left shift instruction, the Nth source word (such as W2) may be less significant than the (N−1)th source word (such as W3), and the shift of the Nth word of the source register to yield the Nth intermediate word (such as W8) may be performed after execution of the shift of the (N−1)th word of the source register.

Next, instruction 402 may continue to be executed by executing an instruction to shift W1 and place the contents in W7, and further to take the shifted-out bits 318B as still resident in shifter 308 and merge them, using OR function 316, with the contents of W8 and store the results in result words 306. The results may be stored in place in W8. SLM W1, #12, W7 may be used. The contents of W1 may be 0xfedcba98, the next lowest significant bits of source words 304. After shifting with instruction SLM W1, #12, W7, W7 may include 0xcba98000, wherein values of 0 are shifted in. Shifted out bit values 318B may be 0xfed, and these may be stored in shifter 308, while the rest of shifter 308 may have values of 0 stored, wherein the rest of the contents were shifted. Then, the contents of shifter 308 may be merged with W8 using OR function 316 and the results stored back in W8. This may be the value 0xcba98765. W8 may be also a result word 306.

Thus, execution of instruction 302 may include a shift of a third source word such as W1, that may be applied for the specified number of bits provided by BIT SIZE may yield a third intermediate word such as W7 and a second set of shifted-out bits such as 318B. Moreover, execution of instruction 302 may include a logical OR operation such as OR function 316 on the second intermediate word such as W8 and the second set of shifted-out bits 318B to yield a second result word such as W8 as stored in result words 306.

Moreover, execution of instruction 302 may thus shift the Nth word (such as W1), shift the (N−1)th word (such as W2), and perform a logical OR operation such as OR function 316 on the (N−1)th intermediate word (such as W8) and the Nth set of shifted-out bits (such as 318B) to yield the (N−1)th destination word (such as W8 in result words 306) for at least intervening words (such as W1 and W2) of the plurality of source words in the source register between a first word (such as W3) and a last word (such as W0) of the plurality of source words 304.

In addition the logical OR operation such as OR function 316 on an (N−1)th intermediate word (such as W8) and the Nth set of shifted-out bits (such as 318B) is to be performed in place on the (N−1)th intermediate word to cause the (N−1)th intermediate word to be the (N−1)th destination word, such as W8 in result words 306.

Finally, instruction 402 may continue be executed by executing an instruction to shift W0 and place the contents in W6, and further to take the shifted-out bits of W6 as still resident in shifter 308 and merge them, using OR function 316, with the contents of W7 and store the results in result words 306. The results may be stored in place in W7. SLM W0, #12, W6 may be used. The contents of W0 may be 0x76543210, the least significant bits of source words 304. After shifting with instruction SLM W0, #12, W6, W6 may include 0x43210000, wherein values of 0 are shifted in. W6 may be stored as a result words 306. Shifted out bit values 318A may be 0x765, and these may be stored in shifter 308, while the rest of shifter 308 may have values of 0 stored, wherein the rest of the contents were shifted. Then, the contents of shifter 308 may be merged with W7 using OR function 316 and the results stored back in W7. This may be the value 0xcba98765. W7 may be also a result word 306.

Thus, execution of instruction 302 may include a shift of a last source word such as W0 for the specified number of bits specified by BIT SIZE to yield a last result word W6 and a last set of shifted-out bits such as 318A. Moreover, execution of instruction 302 may include execution of a logical OR operation such as OR function 316 on a next-to-last intermediate word such as W7 and the last set of shifted-out bits such as 318A to yield a next-to-last result word W7 as stored in result words 306.

Moreover, execution of instruction 302 may include a shift a last source word (such as W0) of the source register for the specified number of bits (such as BIT SIZE) to yield a last destination result word (such as W6) and a last set of shifted-out bits (such as 318A), and execution of a logical OR operation (such as OR function 316) on a next-to-last intermediate word (such as W7) and the last set of shifted-out bits (such as 318A) may yield a next-to-last destination word (such as W7 stored in result words 306).

As shown above, instructions 302, 402 may support multi-word shift instructions. These instructions may be accelerated compared to performing multiple shifts in other software solutions, as multiple registers may need to be used in such other software solutions. Instructions 302, 402 may be implemented, as shown above, by constituent instructions that are a set of 2-cycle, cascaded shift and logical OR instructions that may be used with shifter 302. The number of constituent instructions to implement a given instructions 302, 402 may depend on the size of shifter 308.

Instructions 302, 402, may be used or modified to implement a rotate by using data shifted-out bits 318 from a first constituent instruction that is executed, wherein shifted-out bits 318 would otherwise be discarded. Shifted-out bits 318 may be saved in any suitable register or memory, and may be restored to any suitable location after iterative execution of the constituent instructions.

FIG. 5 is an illustration of an example method 500 for execution of a variable precision multibit shift instruction, according to examples of the present disclosure.

Method 500 may be performed with more or fewer steps than shown in FIG. 5. Steps of method 500 may be optionally repeated, omitted, performed in a different order, performed recursively, performed in parallel, or multiple instances of method 500 may be performed in parallel. Method 500 may be performed by any suitable mechanism, such as those of FIGS. 1-4. In particular, method 500 may be performed by processors 102, 202, 300 or microcontroller 200.

At 505, a shift instruction may be loaded. The shift instruction may be to cause a source data in memory to be shifted left or shifted right. The source data may include source words. The shift instruction may include a source parameter to identify the source data. The shift instruction may include a bit size parameter of a specified number of bits by which the source data is to be shifted.

At 510, the shift instruction may be executed by shifting a first source word of source data by the specified number of bits to yield a first intermediate word.

At 515, the shift instruction may continue to be executed by shifting a second source word of the source data by the specified number of bits to yield a second intermediate word and a first set of shifted-out bits.

At 520, the shift instruction may continue to be executed by executing a logical OR operation on the first intermediate word and the first set of shifted-out bits to yield a first result word. If the shift instruction shifted the source words right, the intermediate word may contain the shifted source words as least significant bits, and the shifted-out bits may be most significant bits. If the shift instruction shifted the source words left, the intermediate word may contain the shifted source words as most significant bits, and the shifted-out bits may be least significant bits.

Figure 6:
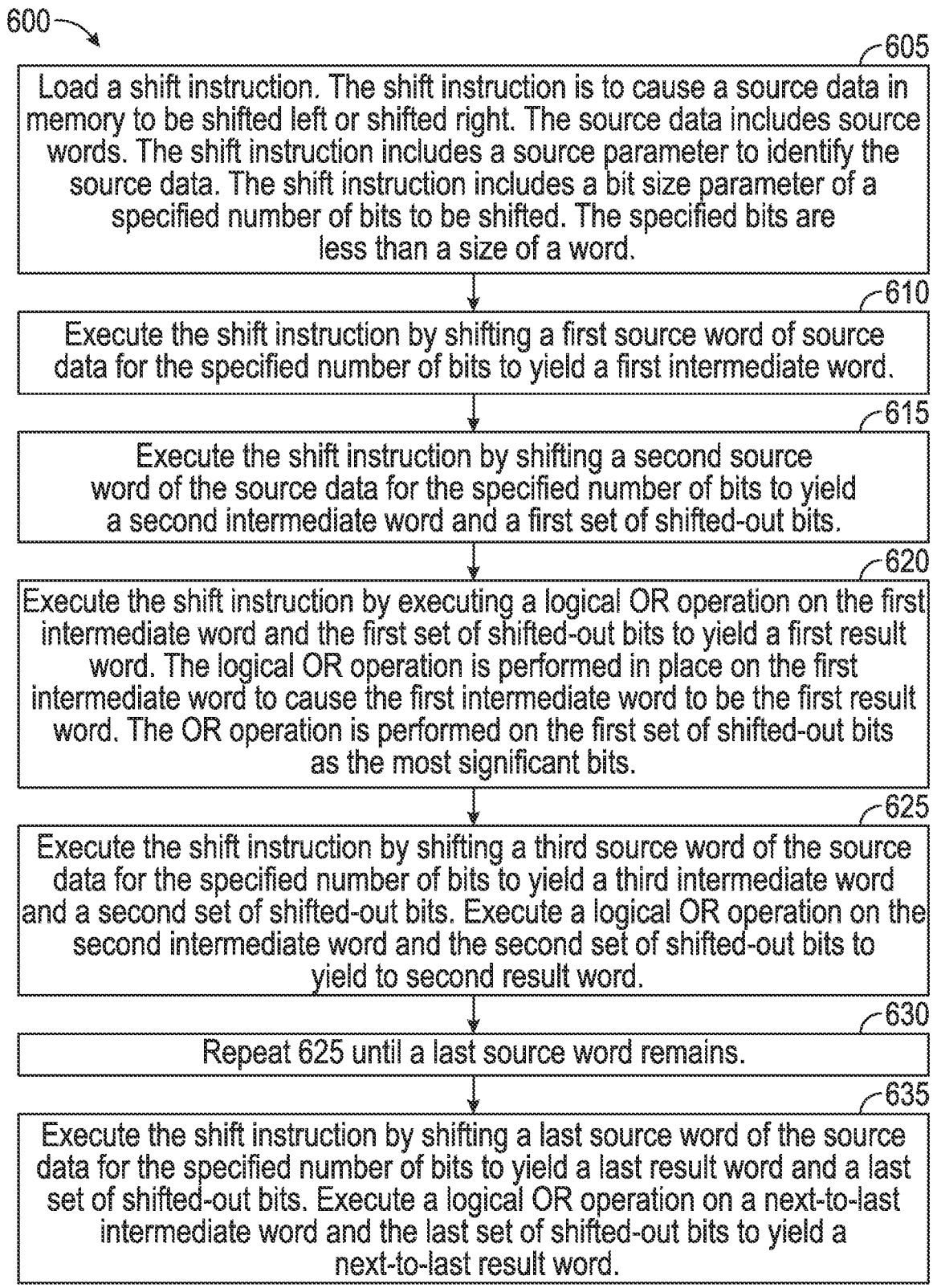
FIG. 6 is a more detailed illustration of an example method for execution of a multibit shift instruction, according to examples of the present disclosure.

FIG. 6 is a more detailed illustration of an example method 600 for execution of a multibit shift instruction, according to examples of the present disclosure.

Method 600 may be performed with more or fewer steps than shown in FIG. 6. Steps of method 600 may be optionally repeated, omitted, performed in a different order, performed recursively, performed in parallel, or multiple instances of method 600 may be performed in parallel. Method 600 may be performed by any suitable mechanism, such as those of FIGS. 1-4. In particular, method 600 may be performed by processors 102, 202, 300 or microcontroller 200. Method 600 may be a more detailed implementation of method 500 of FIG. 6.

At 605, a shift instruction may be loaded. The shift instruction may be to cause a source data in memory to be shifted left or shifted right. The source data may include source words. The shift instruction may include a source parameter to identify the source data. The shift instruction may include a bit size parameter of a specified number of bits by which the source data is to be shifted. The specified number of bits may be less than a word.

At 610, the shift instruction may be executed by shifting a first source word of source data by the specified number of bits to yield a first intermediate word.

At 615, the shift instruction may continue to be executed by shifting a second source word of the source data by the specified number of bits to yield a second intermediate word and a first set of shifted-out bits.

At 620, the shift instruction may continue to be executed by executing a logical OR operation on the first intermediate word and the first set of shifted-out bits to yield a first result word. The logical OR operation may be performed in-place on the first intermediate word to cause the first intermediate word to be a first result word. The OR operation may be performed on the first set of shifted-out bits as the most significant bits.

At 625, the shift instruction may continue be executed by shifting a third source word of the source data for the specified number of bits to yield a third intermediate word and a second set of shifted-out bits. A logical OR operation mat be executed on the second intermediate word and the second set of shifted-out bits to yield a second result word.

At 630, step 625 may be repeated for additional source words until a last source word remains.

At 635, the shift instruction may continue to be executed by shifting a last source word of the source data for the specified number of bits to yield a last result word and a last set of shifted-out bits. A logical OR operation may be executed on a next-to-last intermediate word and the last set of shifted-out bits to yield a next-to-last result word.

Examples of the present disclosure include an article of manufacture comprising a non-transitory machine-readable medium. The medium may comprise instructions. The instructions, when read and executed by a processor, may cause the processor to execute a shift instruction.

In combination with any of the above examples, the shift instruction may cause a source data in memory or a source register to be shifted left or shifted right. The source data or source register may include a plurality of source words. The shift instruction may include a source parameter to identify the source data or source register. The shift instruction may include a bit size parameter to identify a specified number of bits by which the source data or source register is to be shifted. The execution may include a shift of a first source word of the source data or source register by the specified number of bits to yield a first intermediate word, a shift of a second source word of the source data or source register by the specified number of bits to yield a second intermediate word and a first set of shifted-out bits, and execution of a logical OR operation on the first intermediate word and the first set of shifted-out bits to yield a first result word.

In combination with any of the above examples, the instructions may be to cause the processor to execute the shift instruction through a shift of a third source word of the source data or source register by the specified number of bits to yield a third intermediate word and a second set of shifted-out bits, and execution of a logical OR operation on the second intermediate word and the second set of shifted-out bits to yield a second result word.

In combination with any of the above examples, the instructions may be to cause the processor to execute the shift instruction through a shift of a last source word of the source data or source register by the specified number of bits to yield a last result word and a last set of shifted-out bits, and execution of a logical OR operation on a next-to-last intermediate word and the last set of shifted-out bits may yield a next-to-last result word.

In combination with any of the above examples, the execution of the logical OR operation on the first intermediate word and the first set of shifted-out bits may be performed in place on the first intermediate word to cause the first intermediate word to be the first result word.

In combination with any of the above examples, the logical OR operation may apply the first set of shifted-out bits as most significant bits.

In combination with any of the above examples, the specified number of bits is a plurality of bits less than a size of a word of the source words.

In combination with any of the above examples, the shift instruction may be to cause the source data or source register in memory to be shifted left, the first source word may be more significant than the second source word, and the shift of the first source word to yield the first intermediate word may be performed before the shift of the second source word.

In combination with any of the above examples, a source register may be of a capacity of a plurality of source words. A destination register may be of a capacity of a plurality of destination words. The shift instruction may be to shift contents of the source register and store a result in the destination register. The shift instruction may include an identifier of a specified number of bits by which the source register is to be shifted. The execution may include iterative shifting of words of the source register. The iterative shifting may include a shift of an Nth word of the plurality of source words may yield an Nth intermediate word and an Nth set of shifted-out bits. A shift of an (N−1)th word of the plurality of source words may yield an (N−1)th intermediate word and an (N−1)th set of shifted-out bits. Execution of a logical OR operation on the (N−1)th intermediate word and the Nth set of shifted-out bits to yield an (N−1)th destination word for the destination register.

In combination with any of the above examples, the processor may be to shift the Nth word, shift the (N−1)th word, and perform the logical OR operation on the (N−1)th intermediate word and the Nth set of shifted-out bits to yield the (N−1)th destination word for at least intervening words of the plurality of source words in the source register between a first word and a last word of the plurality of source words.

In combination with any of the above examples, the processor may be to execute the shift instruction through a shift a last source word of the source register by the specified number of bits to yield a last destination result word and a last set of shifted-out bits, and execution of a logical OR operation on a next-to-last intermediate word and the last set of shifted-out bits to yield a next-to-last destination word. In combination with any of the above examples, execution of the logical OR operation on (N−1)th intermediate word and the Nth set of shifted-out bits may be performed in place on the (N−1)th intermediate word to cause the (N−1)th intermediate word to be the (N−1)th destination word.

In combination with any of the above examples, the Nth source word may be more significant than the (N−1)th source word, the shift instruction may be a right shift instruction, and the shift of the Nth word of the source register to yield the Nth intermediate word may be performed after execution of the shift of the (N−1)th word of the source register.

In combination with any of the above examples, the Nth source word may be less significant than the (N−1)th source word, the shift instruction may be a left shift instruction, and the shift of the Nth word of the source register to yield the Nth intermediate word may be performed after execution of the shift of the (N−1)th word of the source register.

Examples of the present disclosure may include a microcontroller. The microcontroller may include a source register and a destination register to include source words and destination words, respectively. The microcontroller may include a processor to execute any of the shift instructions of any of the above examples Examples of the present disclosure may include execution or methods of performing or executing of any of the instructions of the above examples. Examples of the present disclosure may include operation or execution or methods of any of the above microcontrollers.

Examples of the present disclosure may include a method. The method may include executing a shift instruction. The shift instruction may cause a source data in memory to be shifted left or shifted right. The source data may include a plurality of source words, the shift instruction to include a source parameter to identify the source data. The shift instruction may include a bit size parameter of a specified number of bits by which the source data is to be shifted. Executing the shift instruction may include executing a logical shift function of a first source word of source data by the specified number of bits to yield a first intermediate word, executing a logical shift function of a second source word of the source data by the specified number of bits to yield a second intermediate word and a first set of shifted-out bits, and executing of a logical OR operation on the first intermediate word and the first set of shifted-out bits to yield a first result word.

In combination with any of the above examples, the method may include executing the shift instruction by executing a shift of a third source word of the source data by the specified number of bits to yield a third intermediate word and a second set of shifted-out bits, and executing a logical OR operation on the second intermediate word and the second set of shifted-out bits to yield a second result word.

In combination with any of the above examples, the method may include executing the shift instruction by execution of a shift of a last source word of the source data by the specified number of bits to yield a last result word and a last set of shifted-out bits, and executing of a logical OR operation on a next-to-last intermediate word and the last set of shifted-out bits to yield a next-to-last result word.

In combination with any of the above examples, the method may include executing the logical OR operation on the first intermediate word and the first set of shifted-out bits in place on the first intermediate word to cause the first intermediate word to be the first result word.

In combination with any of the above examples, the method may include applying the logical OR operation with the first set of shifted-out bits as most significant bits.

In combination with any of the above examples, the specified number of bits may be a plurality of bits less than a size of a word of the source words.

In combination with any of the above examples, the shift instruction may be to shift left the source data in memory, the first source word may be more significant than the second source word, and the method may include shifting the first source word to yield the first intermediate word before shifting the second source word.

Although example examples have been described above, other variations and examples may be made from this disclosure without departing from the spirit and scope of these examples.

The invention claimed is:

1. An article of manufacture comprising a non-transitory machine-readable medium, the medium comprising instructions, the instructions, when read and executed by a processor, cause the processor to execute a shift instruction, the shift instruction to cause a source data in memory to be shifted left or shifted right, the source data including a plurality of source words, the shift instruction to include a source parameter to identify the source data, the shift instruction to include a bit size parameter to identify a specified number of bits by which the source data is to be shifted, through:
   a shift of a first source word of the source data by the specified number of bits to yield a first intermediate word;
   a shift of a second source word of the source data by the specified number of bits to yield a second intermediate word and a first set of shifted-out bits; and
   execution of a logical OR operation on the first intermediate word and the first set of shifted-out bits to yield a first result word.

2. The article of manufacture of claim 1, wherein the instructions are to cause the processor to execute the shift instruction through:
   a shift of a third source word of the source data by the specified number of bits to yield a third intermediate word and a second set of shifted-out bits; and
   execution of a logical OR operation on the second intermediate word and the second set of shifted-out bits to yield a second result word.

3. The article of manufacture of claim 1, wherein the instructions are to cause the processor to execute the shift instruction through:
   a shift of a last source word of the source data by the specified number of bits to yield a last result word and a last set of shifted-out bits;
   execution of a logical OR operation on a next-to-last intermediate word and the last set of shifted-out bits to yield a next-to-last result word.

4. The article of manufacture of claim 1, wherein the execution of the logical OR operation on the first intermediate word and the first set of shifted-out bits is to be performed in place on the first intermediate word to cause the first intermediate word to be the first result word.

5. The article of manufacture of claim 1, wherein the logical OR operation is to apply the first set of shifted-out bits as most significant bits.

6. The article of manufacture of claim 1, wherein the specified number of bits is a plurality of bits less than a size of a word of the source words.

7. The article of manufacture of claim 1, wherein:
   the shift instruction is to cause the source data in memory to be shifted left;
   the first source word is more significant than the second source word; and
   the shift of the first source word to yield the first intermediate word is to be performed before the shift of the second source word.

8. A method, comprising:
   executing a shift instruction, the shift instruction to cause a source data in memory to be shifted left or shifted right, the source data including a plurality of source words, the shift instruction to include a source parameter to identify the source data, the shift instruction to include a bit size parameter of a specified number of bits by which the source data is to be shifted; and
   executing the shift instruction by:
      executing a logical shift function of a first source word of source data by the specified number of bits to yield a first intermediate word;
      executing a logical shift function of a second source word of the source data by the specified number of bits to yield a second intermediate word and a first set of shifted-out bits; and
      executing of a logical OR operation on the first intermediate word and the first set of shifted-out bits to yield a first result word.

9. The method of claim 8, comprising executing the shift instruction by:
   executing a shift of a third source word of the source data by the specified number of bits to yield a third intermediate word and a second set of shifted-out bits; and
   executing a logical OR operation on the second intermediate word and the second set of shifted-out bits to yield a second result word.

10. The method of claim 8, comprising executing the shift instruction by:
   execution of a shift of a last source word of the source data by the specified number of bits to yield a last result word and a last set of shifted-out bits;
   execution of a logical OR operation on a next-to-last intermediate word and the last set of shifted-out bits to yield a next-to-last result word.

11. The method of claim 8, comprising executing the logical OR operation on the first intermediate word and the first set of shifted-out bits in place on the first intermediate word to cause the first intermediate word to be the first result word.

12. The method of claim 8, comprising applying the logical OR operation with the first set of shifted-out bits as most significant bits.

13. The method of claim 8, wherein the specified number of bits is a plurality of bits less than a size of a word of the source words.

14. The method of claim 8, wherein:
   the shift instruction is to shift left the source data in memory;
   the first source word is more significant than the second source word; and
   the method includes shifting the first source word to yield the first intermediate word before shifting the second source word.

15. A microcontroller, comprising:
   a source register, the source register of a capacity of a plurality of source words;
   a destination register, the destination register of a capacity of a plurality of destination words; and
   a processor to execute a shift instruction to shift contents of the source register and store a result in the destination register, the shift instruction comprising an identifier of a specified number of bits by which the source register is to be shifted, the execution to include iterative shifting of words of the source register, including:
      a shift of an Nth word of the plurality of source words to yield an Nth intermediate word and an Nth set of shifted-out bits;
      a shift of an (N−1)th word of the plurality of source words to yield an (N−1)th intermediate word and an (N−1)th set of shifted-out bits; and
      execution of a logical OR operation on the (N−1)th intermediate word and the Nth set of shifted-out bits to yield an (N−1)th destination word for the destination register.

16. The microcontroller of claim 15, wherein the processor is to shift the Nth word, shift the (N−1)th word, and perform the logical OR operation on the (N−1)th intermediate word and the Nth set of shifted-out bits to yield the (N−1)th destination word for at least intervening words of the plurality of source words in the source register between a first word and a last word of the plurality of source words.

17. The microcontroller of claim 15, wherein the processor is to execute the shift instruction through:

shift a last source word of the source register by the specified number of bits to yield a last destination result word and a last set of shifted-out bits;

execution of a logical OR operation on a next-to-last intermediate word and the last set of shifted-out bits to yield a next-to-last destination word.

18. The microcontroller of claim 15, wherein the execution of the logical OR operation on (N−1)th intermediate word and the Nth set of shifted-out bits is to be performed in place on the (N−1)th intermediate word to cause the (N−1)th intermediate word to be the (N−1)th destination word.

19. The microcontroller of claim 15, wherein:

the Nth source word is more significant than the (N−1)th source word;

the shift instruction is a right shift instruction; and the shift of the Nth word of the source register to yield the Nth intermediate word is to be performed after execution of the shift of the (N−1)th word of the source register.

20. The microcontroller of claim 15, wherein:

the Nth source word is less significant than the (N−1)th source word;

the shift instruction is a left shift instruction; and the shift of the Nth word of the source register to yield the Nth intermediate word is to be performed after execution of the shift of the (N−1)th word of the source register.

\* \* \* \* \*